United States Patent Office 3,487,858
Patented Jan. 6, 1970

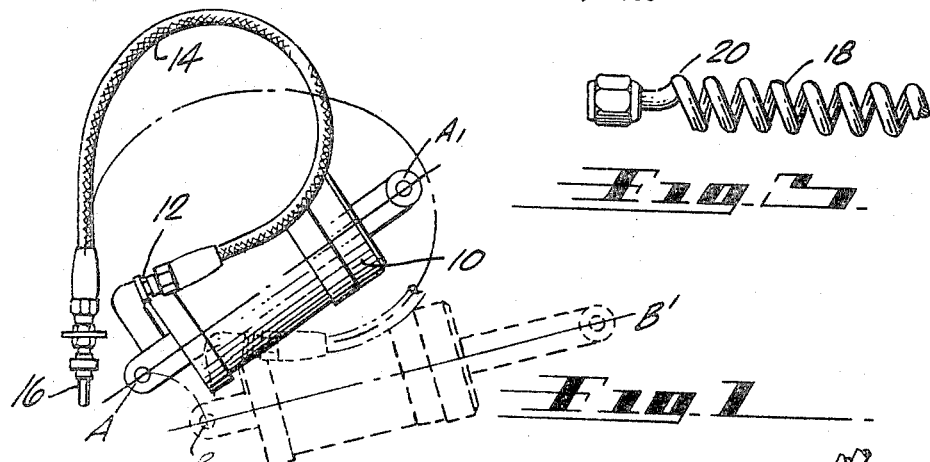
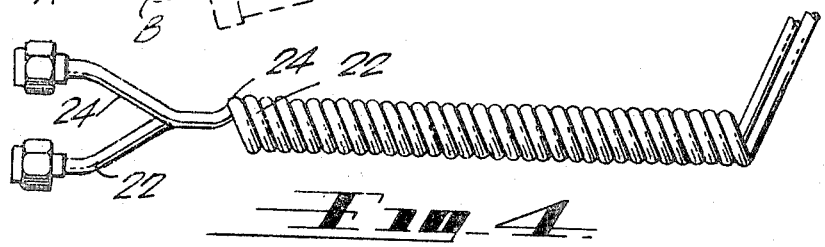
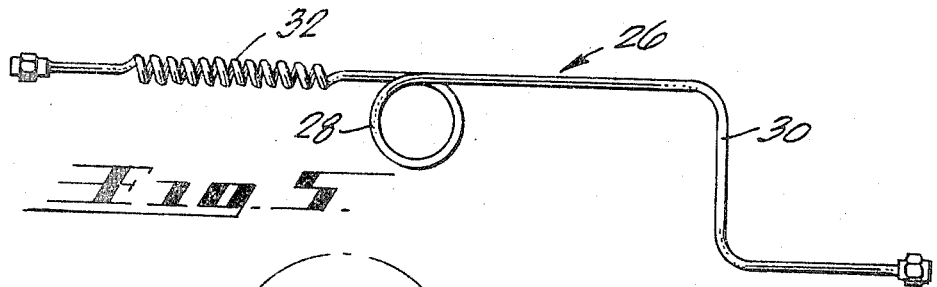
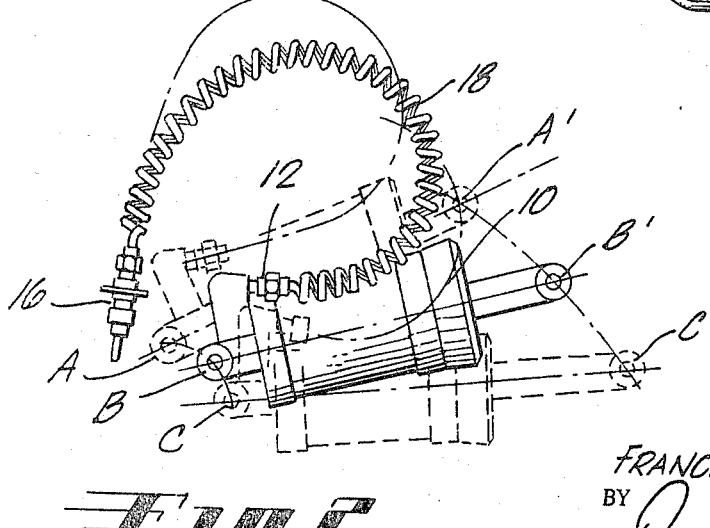
INVENTOR.
FRANCIS J. HANBACK
BY
— AGENT —

3,487,858
PREFORMED COILED FLEXIBLE TUBING
Francis J. Hanback, Palos Verdes Peninsula, Calif., assignor, by mesne assignments, to McDonnell Douglas Corporation, Santa Monica, Calif., a corporation of Maryland
Filed Jan. 11, 1966, Ser. No. 520,011
Int. Cl. F16l *11/00, 9/00*
U.S. Cl. 138—118                                                2 Claims

ABSTRACT OF THE DISCLOSURE

A flexible coiled tubing which is to be employed in movable installation and preformed to be in a state of zero stress at the mid-point of movement. The material and length of the tubing is chosen in view of the limits of movement so that the tubing at no time exceeds the elastic limit.

---

Since the inception of elastomeric hoses for use in high pressure hydraulic tubing systems, such hoses have been known as the "weakest link" in the system. Elastomeric hoses are usually installed in a stressed condition thereby precipitating a premature hose failure. Also, besides the fact of hidden defects and age deterioration of the elastomeric material, such hoses are not compatible with the durability of the adjacent rigid metal tubing within the hydraulic system especially when subjected to a substantially high fluid pressure.

As the cost of replacement for elastomeric hoses is large, much effort has been expended in the improvement of elastomeric flexible tubing. Improvements such as swivel fittings, coiling of the hose and placement of flexible steel strips within the hose material definitely eliminates some of the problems of elastomeric hoses, however, such improvements substantially raise the cost of elastomeric hose installation.

The subject matter of this invention overcomes the problems associated with elastomeric hoses while still incorporating the flexibility of such hoses. Metallic tubing is constructed in a tight coil, preformed to its particular intended application and installed so the flexibility of the tubing is positive to negative. The advantages of such a tubing installation are: (1) The durability of the flexible tubing matches the durability of the connected rigid tubing thereby eliminating periodic replacement; (2) the flexible metallic tubing is installed at a point of zero stress, allowing for both positive and negative flexures thereby decreasing the possibility of a tubing fatigue failure; (3) metallic tubing as compared to elastomeric tubing is relatively inexpensive; (4) if the metallic tubing develops a break, the loss of fluid pressure would be gradual where a break in elastomeric tubing results in an immediate complete loss of pressure.

Each section of tubing is easily constructed. Straight tubing is wound on a mandrel to assume the tightly coiled shape. The number or size of the coils varies as to the metal employed in the tubing and the amount of flexibility desired. Stainless steel has been found to have the necessary physical properties for a satisfactory tubing material, permitting sufficient flexure movement while maintaining a high fatigue stress breaking point. Titanium has been proven to be extremely satisfactory but its high cost prohibits universal application. Other tubing materials could be employed such as aluminum, if desired.

Coil size and the number of coils can vary widely. The larger the diameter of the coils, the more flexible the tubing. Similarly, the more coils employed, the more flexible the tubing providing the coils are not so close as to contact each other during flexures. As an example, for an installation similar to that shown in the drawing, a two foot coiled length of stainless steel tubing with coils of approximately three-fourths of an inch in diameter and three coils per inch of length has been found to adequately permit a sixteen to eighteen inch movement. A larger coil diameter would permit a slight increase of length of movement. However, a sixteen to eighteen inch movement is usually more than satisfactory for most installations.

Other objects and features of the invention will become apparent as the description proceeds, particularly when taken in conjunction with the accompanying drawing illustrating the invention wherein:

FIGURE 1 is a view of the prior art elastomeric hose operating in a typical installation;

FIG. 2 is a view similar to FIG. 1 employing the tubing of this invention instead of the prior art elastomeric hose;

FIG. 3 shows a modification of a tubing end;

FIG. 4 shows two separate sections of tubing co-acting to occupy the space of a single tubing section; and FIG. 5 shows how the invention may be employed in an extended length of tubing.

With particularity, FIG. 1 shows a hydraulic actuator 10 being movable from point A to point B and points A' to B', respectively, and vice versa. Actuator 10 has a hydraulic inlet 12 connected through conventional hydraulic connections by an elastomeric hose 14 from a rigid hydraulic supply line 16 through conventional hydraulic connections. It is well known that an elastomeric hose is in a state of non-stress when such hose is in a straight position, therefore, the hose as applied in FIG. 1 (a typical application) is in a state of stress. Such a stressed condition will obviously help create a premature hose failure. The amount of flexibility of the hose 14 is not necessary for such an installation as the amount of movement is within points A–B.

In FIG. 2 there is shown the installation of FIG. 1 employing a coiled metallic tubing 18 of this invention for the elastomeric hose 14. The mid-point of movement B of the actuator 10 is established between points A and C. The coiled tubing 18 is cold worked to assure a point of zero stress when the actuator is located in position B–B' assuming actuator movement is frequent and varying from position A to position C. In some installations, movement may be infrequent and much of the time the tubing will be located in one of the extremities of movement. In such an installation it is desirable to preform the tubing to be at zero-stress at the extremity in which the tubing will be primarily located.

The length of the tubing 18 is determined from the amount of movement desired, the metallic material employed in the tubing structure and the number of coils within the length of tubing. Therefore, a tubing installation is established which gives the desired flexibility without exceeding the material's elastic limit and is so chosen as to be far enough below the elastic limit so as not to fail in fatigue in several thousand flexures.

As shown in FIG. 3, the tubing 18 near its extremities may be modified to include an additional layer of metallic material 20 or some other adequate material. The weakest position of a tubing section is near the extremities, therefore, if a substantial movement is anticipated, it would be desirable to include such a strengthening layer of material.

The strengthening layer can be applied by the addition of a short length of larger diameter tubing over the tubing 18 and subsequently wound into the coiled shape. If desired, such a sleeve may be firmly secured to the tubing 18 as by brazing or welding.

Only with this type of metallic tubing can the arrangement as shown in FIG. 4 be obtained. Two separate sections of tubing 22 and 24 each conducting a fluid are capable of occupying the space normally assumed by a single tubing length. Each of the coils of one of the tubing sections 22 is placed within the gap between two adjacent coils of the other tubing section 24. Such an arrangement of tubing sections are necessary. By spacing of the distance between the coils of the tubing, two, three or even four tubing sections may be arranged as shown in FIG. 4.

In FIG. 5 there is shown an extended length of tubing section 26 which is desirable in some hydraulic installations. Substantial torsion and lateral movement, limited longitudinal movement and a reasonable amount of flexure movement can be accommodated by tubing section 26. The lateral movement and torsion are absorbed through the lateral section 30 of tubing. The longitudinal movement is absorbed in the coil 28. Through the tight coiled section 32, quick and rapid flexure movement is absorbed without endangering the tubing 26 in failure. One or more of such movement absorption means may be constructed within a length of tubing depending upon the type of movement and amount of movement of each installation.

A tubing section formed per this invention allows for a more than adequate degree of movement. However, heat treating such tubing after forming and preforming could be more than double the ultimate strength of the material. Such a large degree of movement is not necessary under present installations, however, future uses may require such flexibility.

The various features and advantages are thought to be clear from the foregoing description. Various other features and advantages not specifically enumerated will undoubtedly occur to those versed in the art, as likewise will many variations and modifications of the embodiments of the invention illustrated, all of which may be achieved without departing from the spirit and scope of the invention as defined by the following claims.

I claim:
1. A hydraulic system comprising:
a rigid tube adapted to conduct fluid under pressure;
a moving actuator having a predetermined path of movement, said path of movement being arcuate with respect to said rigid tube and being reciprocal and restrictive to a single arc, said actuator having a moving pivot and the movement of said actuator being pivotal relative to said moving pivot;
a flexible metallic tubing connecting said rigid tube and said moving actuator for conducting fluid therethrough under pressure, said flexible metallic tubing being wound in a series of coils, said coils being longitudinally spaced from each other, said flexible metallic tubing being preformed to an arcuate configuration and in a state of zero stress at the midpoint of said path of movement, said flexible tubing having a length directly correlated with the limits of said path of movement so that said flexible tubing does not exceed the elastic limit of tubing material during movement of said moving actuator.

2. The system of claim 1 wherein said flexible tubing includes:
an additional layer of tubing material near its extremities whereby the extremities of said tubing are protected from failure.

References Cited

UNITED STATES PATENTS

| | | | |
|---|---|---|---|
| 2,832,374 | 4/1958 | November | 138—111 X |
| 3,402,743 | 9/1968 | Brueder | 138—178 |
| 1,443,550 | 1/1923 | Wilkinson | 141—4 XR |
| 2,320,178 | 5/1943 | Goldstein | 138—118 XR |

FOREIGN PATENTS

| | | |
|---|---|---|
| 606,925 | 8/1948 | Great Britain. |
| 311,482 | 5/1929 | Great Britain. |
| 908,532 | 10/1962 | Great Britain. |

SAMUEL ROTHBERG, Primary Examiner

U.S. Cl. X.R.

138—178